United States Patent [19]

Lebrun et al.

[11] 4,254,912

[45] Mar. 10, 1981

[54] MOBILE SPRAYING APPARATUS FOR WATERING CULTIVATED SURFACES

[76] Inventors: Henri V. Lebrun, Le Thuel, 02340 Montcornet; Pierre A. Boutboul, 71, rue Liandier, 13008 Marseille, both of France

[21] Appl. No.: 46,642

[22] Filed: Jun. 8, 1979

[30] Foreign Application Priority Data

Jun. 9, 1978 [FR] France ............................... 78 17849

[51] Int. Cl.³ .............................................. A01G 25/09
[52] U.S. Cl. .................................... 239/183; 239/191; 239/199; 239/DIG. 1
[58] Field of Search ............... 239/183, 184, 188–192, 239/198, 199, 242, 249, 251, DIG. 1; 137/344, 355.16, 355.2, 355.27

[56] References Cited

U.S. PATENT DOCUMENTS

| 1,068,797 | 7/1913 | Mathers | 239/191 X |
| 4,174,809 | 11/1979 | Arlemark | 239/191 X |

FOREIGN PATENT DOCUMENTS 566914  2/1924  France ...................................... 239/192

Primary Examiner—Andres Kashnikow

[57] ABSTRACT

The present invention relates to a mobile apparatus for watering cultivated surfaces, which comprises a self-propelled carriage carrying a watering rotor composed of tubular arms which carry watering hose nozzles and which are mounted on a hollow pivot connected to a water inlet itself connected to a hydrant by a flexible hose pipe. The carriage carries a hydraulic turbine driven by the water for watering and transmission members which drive the pivot in rotation independently of the reaction of the jets of water.

10 Claims, 4 Drawing Figures

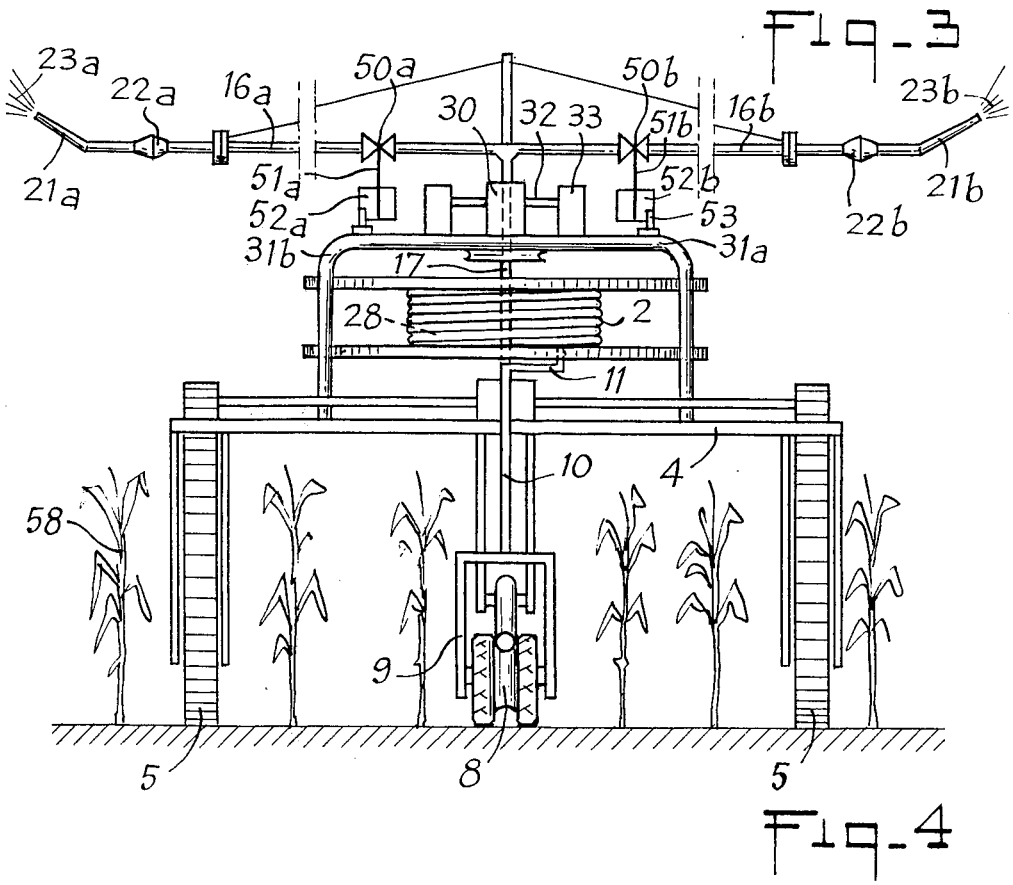
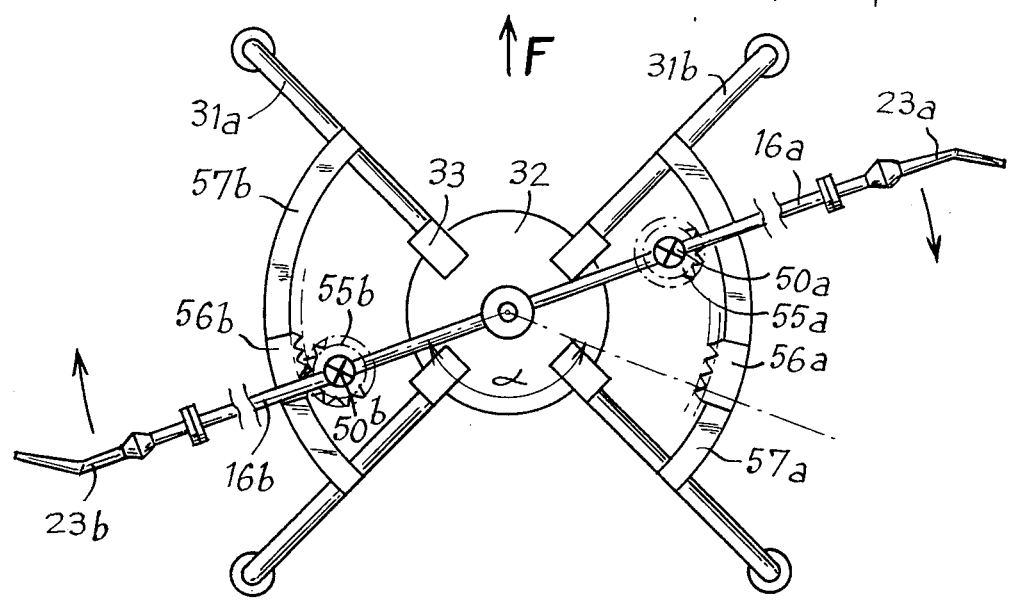

MOBILE SPRAYING APPARATUS FOR WATERING CULTIVATED SURFACES

The present invention relates to mobile spraying apparatus for watering cultivated surfaces, for example fields of cereals (Indian corn), vegetables (tomatos, lettuces) and generally of plants planted in rows.

To water cultivated fields by spraying, the perforated pipes laid on the ground are being abandoned more and more in favour of mobile apparatus carrying spraying means which are automatically displaced continuously through a field. This displacement is most often obtained by using the pressure of the watering water, so that the apparatus is self-contained during watering. The spraying means are connected to the water source by a flexible hose pipe. In certain known apparatus, the flexible hose pipe is wound on a reel and pulls the spraying means or displaces a carriage carrying the reel and the spraying means. In other known apparatus, the carriage which carries the spraying means pulls behind it the flexible hose pipe which forms a loop placed on the ground or passing over a pulley. The spraying means used up to the present time on these mobile watering apparatus are of two main types.

A first type of spraying means is constituted by watering spouts which are composed of a hose nozzle which projects a powerful jet of water under high pressure at a considerable distance, and of which the rotation covers an angular sector. The spout rotates in jerks under the action of the jet of water on a lever bearing a spoon shaped member. The watering spouts have a wide range, of the order of 50 meters and a high rate of flow of the order of 20 to 100 m$^3$/hr. They require a high pressure equal to at least 5 bars. Between each jerk, the watering spouts deliver a massive quantity of water over a reduced surface, hence a very high instantaneous pluviometry which brings about serious drawbacks such as ground subsidence, streaming of the water and the deterioration of the plants which are often laid flat or broken by the fall of water.

French Pat. Nos. 71 13802, 72 12990, 74 07096 and 77 31780 describe (respectively publications Nos. 2,134,753; 2,179,596; 2,262,487 and 2,368,218) mobile watering apparatus equipped with a spout.

Another type of known spraying means is constituted by sprinklers or rotors composed of pairs of diametrically opposite arms, mounted on a vertical pivot and each bearing a water hose nozzle at its free end. The reaction of the water jets produces a torque which takes the rotor in a continuous movement of rotation about the vertical pivot and mobile apparatus have been constructed in which the rotor is mounted on a carriage which is displaced by the sprinkler which acts as hydraulic motor. French Pat. Nos. 73 07827 and 72 31034 (respectively publications Nos. 2,174,299 and 2,197,505) describe apparatus of this latter type. These latter apparatus present the advantage over the apparatus with spraying spout, that the instantaneous pluviometry is lighter, but they have the following drawbacks. They water a circular surface which extends all around the mobile apparatus, and particularly in front of it, so that the apparatus must advance on ground which has already been watered, this making progress difficult. The watering hose nozzles cannot be disposed radially in order that the reaction of the jets has a tangential component which creates the torque, this reducing the range of the nozzles.

The pressure of the jets must be fairly high, of the order of 5 bars, to produce a sufficient torque to drive the rotor and possibly the carriage which carries it. Moreover, part of the energy of the water is converted into mechanical work with a very poor yield, this reducing the range of the jets of water. Finally, it is virtually impossible to vary the instantaneous pluviometry as, if the pressure is lowered to reduce the rate of flow, the speed of rotation is automatically reduced and the instantaneous pluviometry remains substantially the same.

It is an object of the present invention to provide mobile watering apparatus equipped with rotors bearing watering hose nozzles placed at the end of arms mounted on a vertical pivot, which overcome the drawbacks of the known spraying means of the spout type or of the rotor type driven by the torque due to the reaction of the jets of water.

Another object of the present invention is to provide watering apparatus which distribute the water in fine droplets with an instantaneous pluviometry which does not deteriorate the plants, which enables this pluviometry to be easily regulated according to the nature of the plants and which also enables the water distributed to be used at a relatively low pressure, of the order of 3 bars for example.

The invention relates to mobile apparatus for watering cultivated surfaces by spraying, which comprise, in known manner, a self-propelled carriage which is connected to a hydrant by a flexible hose pipe, and which carries a watering rotor comprising tubular arms, each carrying a watering hose nozzle, which are mounted on a hollow vertical pivot.

The objects of the invention are attained by means of a mobile watering apparatus of this type in which the self-propelled carriage carries a motor and mechanical transmission members for driving said rotor in continuous rotation by said motor, independently of the reaction of the jets of water leaving the nozzles.

According to a preferred embodiment, the mobile carriage comprises a hydraulic turbine which is driven in rotation by the water for watering and locomotion means which are driven by said turbine and it comprises a mechanical transmission and a speed variator which transmit the movement of rotation of the turbine to the pivot bearing the rotor. Each of the tubular arms of the rotor carries a valve which is provided with a downwardly directed manoeuvring rod, which carries at its lower end a member for manoeuvring in rotation and the self-propelled carriage bears stops which cooperate with said manoeuvring members so that, in the course of each revolution of the rotor, each valve is successively opened by one stop then closed by the other stop and the rotor waters solely within a circular sector. The pivot of the rotor is preferably maintained by a bearing which is located slightly below the tubular arms and said carriage carries stabilizer members which support said bearing.

The invention results in new mobile apparatus for automatically and continuously watering successive cultivated strips. The width of each cultivated strip is equal to twice the maximum range of the spraying means carried by the self-propelled carriage. The fact that the rotor is rotated by means of a motor and a mechanical transmission and therefore totally independently of the reaction of the jets of water makes it possible to obtain a wider range. In fact, the watering nozzles may be disposed radially and even slightly inclined forwardly and upwardly to obtain the maximum range without having to seek a compromise between the range and the torque due to the reaction of the jets.

Another advantage of the apparatus according to the invention lies in the fact that the rotor may be rotated at the desired speed by using a speed variator. The speed of the rotor is totally independent of the rate of flow of the nozzles and the instantaneous pluviometry may therefore be varied as desired. In particular, a speed of rotation may be obtained which is much higher than that of the known rotors which are driven by the reaction of the jets and, upon each passage of the rotor over a cultivated zone, a low instantaneous pluviometry may be attained similar to that of a shower of rain which does not risk spoiling fragile crops, for example flowers, fruit or vegetables.

A further advantage of the apparatus according to the invention, provided with a rotor mechanically driven in rotation independently, and comprising pairs of diametrically opposite nozzles, lies in the fact that it becomes possible automatically to stop one nozzle out of two in each pair so that the rotor waters only over a semi-circle whilst continuing to rotate about the pivot. Such an arrangement would not be possible on the known rotors which are driven by the reaction torque as it is necessary on these to create this torque and therefore constantly to have two diametrically opposite jets. The fact of being able to water solely within an angular sector makes it possible, for example, to choose a sector located behind the self-propelled carriage, so that said latter advances on dry land. Stops which may be moved over a circular sector may also be provided, so that it is possible to modify the orientation of the watered sector, this being particularly advantageous in the case of having to water along the boundary of a field.

The invention will be more readily understood on reading the following description with reference to the accompanying drawings, in which:

FIG. 3 is a transverse view thereof along line III—III of FIG. 1;

FIG. 4 is a partial plan view of a variant embodiment.

Figure 1:
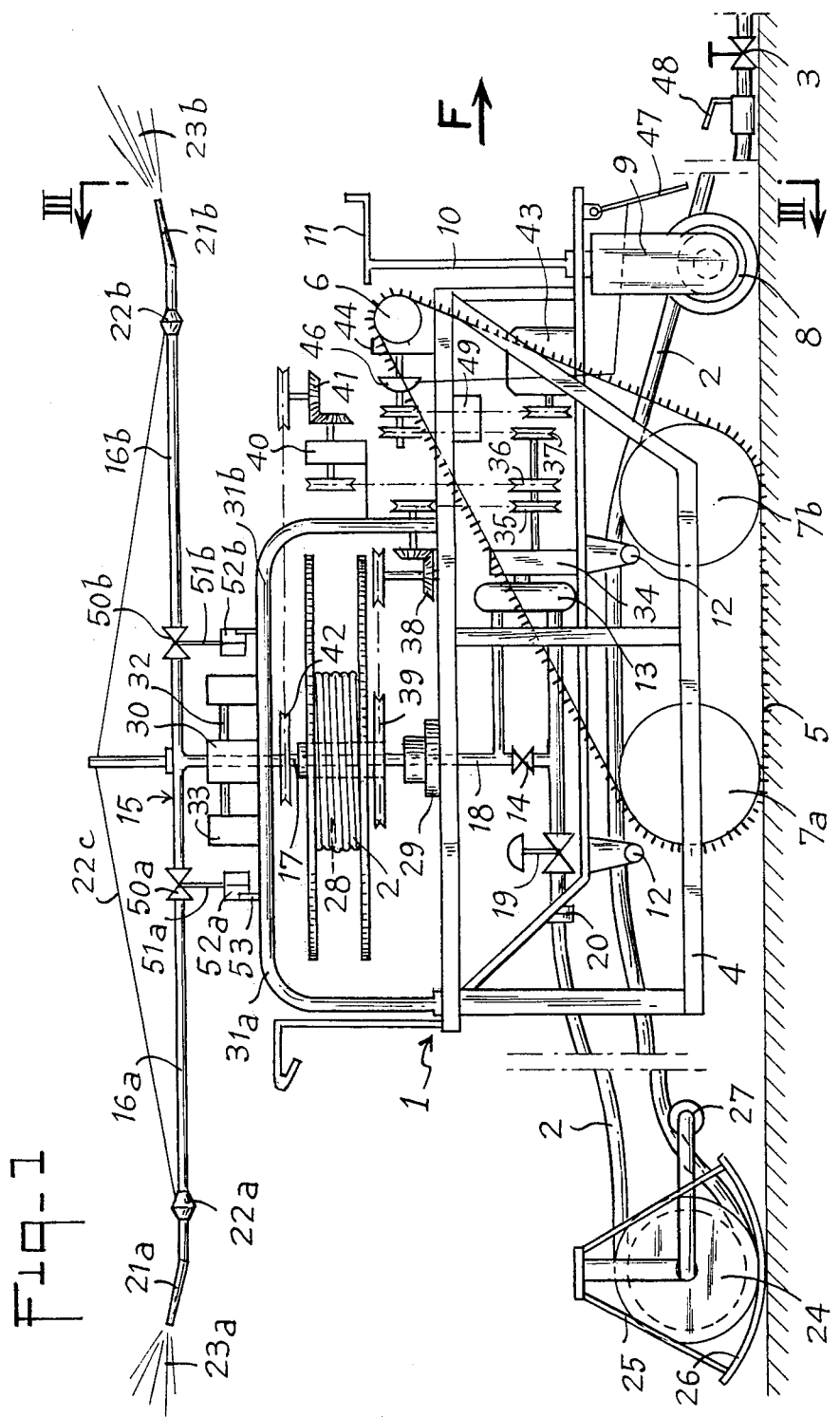
FIG. 1 is a view in elevation of the mobile watering apparatus according to the invention.
Figure 2:
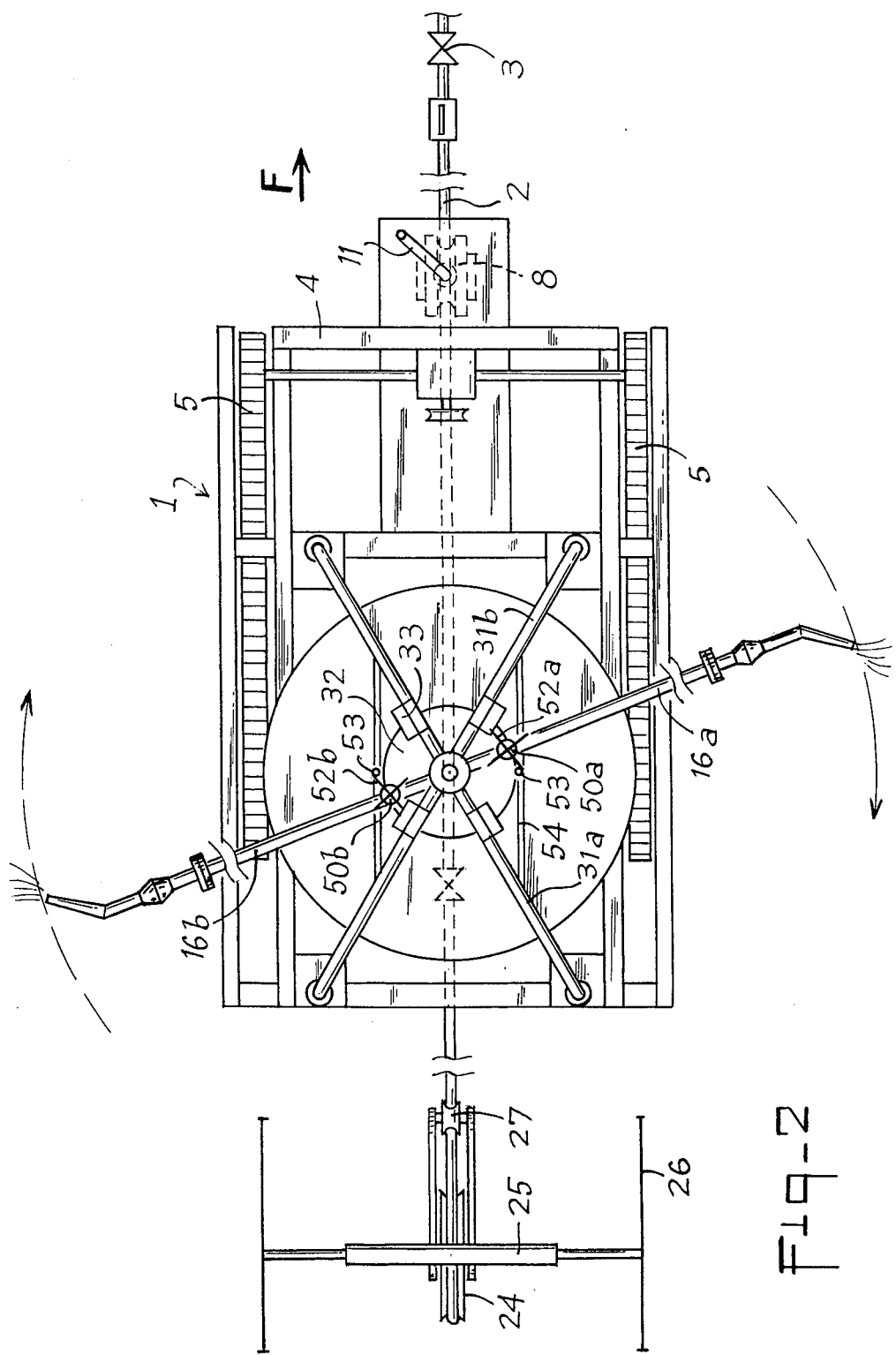
FIG. 2 is a plan view thereof.

Referring now to the drawings, FIGS. 1, 2 and 3 show, by way of illustration, a mobile watering apparatus adapted to continuously and automatically water by spraying successive strips of cultivated fields. This apparatus comprises a self-propelled carriage 1 which is connected by a flexible hose pipe 2 to a hydrant 3. The carriage 1 comprises a chassis 4 straddling several strips and locomotion members which are preferably constituted by two endless tracks 5, which are driven by two driving wheels 6 and which each comprise two wheels 7a, 7b which apply the endless track on the ground. Of course, the tracks could be replaced by driving wheels.

The carriage 1 comprises a front steering wheel 8 which comprises a groove in which the hose pipe 2 passes. This front wheel 8 is mounted in a fork joint 9 pivoted about a vertical shaft 10 which is provided with a handle 11 or a wheel which enables the carriage to be steered on the highway. In the field, during watering, the carriage is guided alone by following the pipe 2. The hose pipe 2 passes over guide rollers 12 carried by the chassis 4. The carriage 1 is equipped with a hydraulic turbine 13 which has the watering water passing therethrough and which is driven in rotation thereby. A valve 14 makes it possible to pass the water in the turbine 13 or to short circuit same.

The carriage 1 carries a watering rotor 15 which comprises hollow tubular arms 16a and 16b which are mounted on a hollow vertical pivot 17. An embodiment has been shown in which the rotor comprises two arms 16a and 16b which are diametrically opposite, but it could, of course, comprise any number of arms.

The hollow pivot 17 is connected via a rotary joint to a coaxial fixed tube 18 which comprises a valve 19 and a water inlet 20 on which the second end of the hose pipe 2 is connected. The arms 16a and 16b may be of variable length, for example by means of a telescopic device. Each tubular arm 16a, 16b carries at its free end a nozzle 21a, 21b which is supplied with water through the pipe 2, the water inlet 20, the fixed tube 18, possibly the turbine 13, the hollow pivot 17 and one of the tubular arms 16a or 16b. The nozzles 21a and 21b are mounted on swivel joints 22a, 22b which enable the inclination and/or orientation of the nozzles and therefore of the jets of water 23a, 23b that they distribute, to be varied. Tighteners fixed to stays 22c enable the swivel joints to be manoeuvred.

The apparatus shown in FIGS. 1 to 3 further comprises a vertical guide pulley 24 which is carried by a gantry shaped member 25 placed on two runners 26 which slide on the ground. The hose pipe 2 passes over the pulley 24, forming a loop. The gantry shaped member 25 is telescopic as shown in FIG. 2, this enabling the width to be varied.

It carries a small pulley 27 for guiding the hosepipe.

The carriage 1 further carries a reel 28 which is coaxial with the pivot 17. The reel 28 serves to store and transport the hose pipe 2 when it is not used for watering. The hose pipe 2 may be formed by a plurality of sections which are assembled end to end according to need. The pivot 17 is supported by a rotary joint 29 located at its base and by a bearing 30 which is located slightly below the arms 16a, 16b. The pivot 17 is supported by stabilizing members 31a, 31b which are arranged for example as a cross on the chassis 4. It is seen that the reel 28 is placed in the space located beneath said stabilizing members, this limiting the bulk. The bearing 30 carries a balancing plate 32 in the form of a horizontal disc which passes through slots cut out horizontally in blocks 33 fixed on the members 31a, 31b.

According to the invention, the vertical pivot 17 carrying the rotor 15 is driven in rotation by mechanical transmission members which communicate thereto the movement of rotation of the turbine after gearing down.

FIG. 1 schematically shows a transmission which comprises a reduction gear 34 coupled with the turbine 13. The driven shaft of the reduction gear 34 carries three pulleys 35, 36, 37. The pulley 35 drives, via a belt transmission, a bevel gear 38 which drives a pulley 39 fast with the reel 28. The pulley 36 drives, via a belt transmission, a speed variator 40 which drives, via a bevel gear 41, a pulley 42 fast with the pivot 17. Thus, during watering, the turbine 13 drives the rotor 15 in rotation and the speed variator 40 enables the speed of the rotor to be adjusted. As a variant, the speed variator 40 may be driven by a small electric motor supplied by a battery.

The carriage 1 further carries an auxiliary motor 43, for example a heat engine or an electric motor supplied by batteries. The driving wheels 6 of the endless tracks are driven in rotation by a differential 44 and said latter is driven, via a clutch 46, either by the turbine 13, by means of the pulley 37, or by the auxiliary motor 43. The auxiliary motor 43 may also rotate the reel 28 or the speed variator 40. The clutch 46 comprises a manoeuvring lever which is connected by a linkage to a lever 47 located at the front of the carriage. A stop carrying a projecting push member 48 is fixed on the hose pipe 2 near the hydrant 3 and, when the carriage arrives near the hydrant, the push member 48 pushes the lever 47 and said latter acts on the disconnecting mechanism 46, this automatically stopping the advance of the carriage. The carriage further carries a hydraulic slide valve 49 and the linkage connected to the lever 47 acts on this slide 49 which automatically controls the closure of a hydraulically controlled stop valve 19 placed on the water inlet 20.

The auxiliary motor 43 serves to displace the carriage on the highway and before the beginning of watering, whilst the turbine 13 serves to displace the carriage in a continuous movement during watering and to drive the rotor 15 at the same time. The reel 28 is rotated at the end of watering, to recover the hose pipe, by the auxiliary motor 43.

Each tubular arm 16a and 16b is equipped with a rapidly closing valve 50a, 50b, for example a valve with rotating key which opens or closes by the rotation of the key through a quarter turn. These valves 50a and 50b comprise a downwardly directed vertical manoeuvring rod 51a, 51b which carries at its lower end a member 52a, 52b for manoeuvring in rotation.

In the example of FIGS. 1 to 3, the manoeuvring member is a star wheel having four arms in the form of a cross. The carriage 1 carries two projecting stops 53 and in the course of each revolution of the rotor, the manoeuvring member 52 of each valve successively abuts on each stop and makes a quarter turn so that each valve is successively opened by one stop and closed by the following stop and each nozzle waters in a circular sector comprised between the two stops. For example, the two stops may be placed as shown in FIG. 2 on two cross bars 54 carried by the members 31a and 31b. The two stops are preferably diametrically opposite and located in the transverse plane of symmetry, so that the rotor waters only a semi-circle and the semi-circle located behind the carriage is chosen, said carriage advancing during watering in the direction of arrow F.

FIG. 4 shows a partial plan view of another embodiment in which the members for manoeuvring the valves 50a and 50b are pinions 55a and 55b which cooperate with racks 56a and 56b in the form of toothed sectors placed on a circular rail 57a and 57b so that the racks may be displaced to adjust the angular opening α of the sector watered by the rotor or for varying the orientation of this sector.

As shown in FIG. 3, the chassis 4 is a chassis straddling several strips, which may circulate even in fields where plants are cultivated in rows, for example Indian corn 58. The endless tracks 5 and the steering wheel 8 are sufficiently narrow to circulate between two rows of plants.

The functioning of the apparatus described is as follows. The carriage is self-propelled due to the auxiliary motor 43 and it is placed near a hydrant 3. One end of the hose pipe 2, which is wound on the reel 28, is connected to this hydrant. The carriage then moves away from the hydrant 3, unwinding the hose pipe behind it. When it arrives at the other end of the field, the gantry shaped member 25 carrying the guide pulley 24 is placed on the ground. The gantry shaped member 25 also straddles several strips, as shown in FIG. 2. The motor 43 is stopped. The second end of the hose pipe is connected to the water inlet 20, then the valve 3 is opened. The carriage then moves in a continuous movement in the direction of arrow F, returning towards the hydrant 3 and the rotor rotates, being driven by the turbine 13. Due to the variator 40, the speed of rotation of the rotor is regulated. Arriving near the hydrant 3, the push member 48 acts on the lever 47 and stops the advance of the carriage and watering.

The gantry shaped member 25 carrying the pulley 24 moves in the same direction as the carriage 1, being pulled by the hose pipe, but it advances at half the speed.

A watering apparatus of a particular type has been described to illustrate the invention. It is specified that the invention protects any mobile watering apparatus comprising a self-propelled carriage carrying a rotor according to the invention which is driven in rotation by a motor independently of the reaction of the jets of water and which preferably comprises valves cooperating with stops to distribute water in a determined angular sector.

What is claimed is:

1. A mobile spraying apparatus for watering cultivated surfaces, comprising a self-propelled carriage which is connected to a hydrant by a flexible hose pipe and which carries a watering rotor comprising tubular arms, mounted on a hollow vertical pivot, each arm carrying a watering hose nozzle and means for driving said rotor in rotation, wherein each of the tubular arms of said rotor carries a valve which is provided with a manoeuvring rod which is directed downwardly and which carries at its lower end a member for manoeuvring said rod in rotation and wherein said self-propelled carriage carries stops which cooperate with said manoeuvring members so that, in the course of each revolution, each valve is successively opened by one stop then closed by another stop and said rotor waters solely within a circular sector.

2. The watering apparatus of claim 1, wherein said manoeuvring members are constituted by a star wheel having four arms in the form of a cross, which meet said stops and which causes said manoeuvring rod to pivot by a quarter turn.

3. The watering apparatus of claim 1, wherein said manoeuvring members are toothed pinions and said carriage carries two diametrically opposite racks which mesh with said pinions when said latter pass in front of said racks.

4. The watering apparatus of claim 1, further comprising a vertical pulley fixed to a gantry shaped member carried by runners and said carriage comprises a front steering wheel with groove, transverse guide rollers and a water inlet and said watering hose pipe is connected by one of its ends to a hydrant, passes in said grooved wheel, on said guide rollers, on said vertical pulley and it is connected to said water inlet by its other end.

5. A watering apparatus according to claim 1, wherein said carriage carries stabilizer members, located beneath said tubular arms, supporting said vertical pivot and wherein said stops are carried by said stabilizer members.

6. A watering apparatus according to claim 5 in which said hollow vertical pivot of said rotor carries a balancing plate formed by a horizontal disc which passes through slots cut out horizontally in blocks fixed on said stabilizer members.

7. A watering apparatus according to claim 5 comprising a reel adapted to receive said flexible hose pipe after watering is terminated; which reel has a vertical axis merging with the axis of said vertical pivot and is located between said stabilizer members.

8. A watering apparatus according to claim 1, wherein said carriage carries stabilizer members located beneath said tubular arms and wherein said stops are carried by rails fixed between said stabilizer members.

9. A watering apparatus according to claim 1 in which said self-propelled carriage comprises a chassis adapted to straddle several strips of cultivated plants, and two endless tracks, each passing over two wheels which abut on the ground and on a third driving wheel.

10. A watering apparatus according to claim 9, wherein said self-propelled carriage comprises a differential driving said two driving wheels, an hydraulic turbine driven in rotation by watering water, an auxiliary motor and transmission members for coupling said differential either to said hydraulic turbine during watering or to said auxiliary motor during displacements on the highways and for driving said rotor either by said turbine or by said auxiliary motor.

* * * * *